Nov. 30, 1954     L. DOBKIN     2,695,722
BAMBOO ARTICLE
Filed April 11, 1951     2 Sheets-Sheet 1
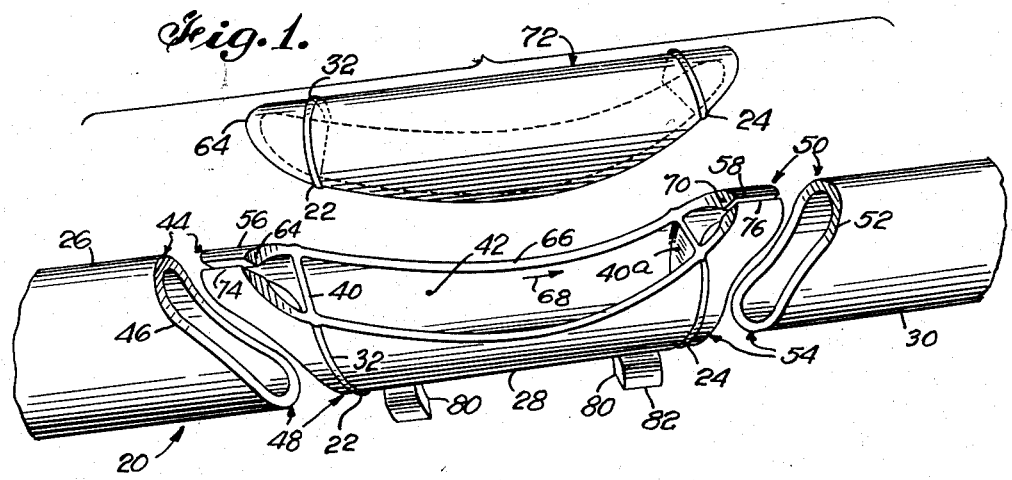
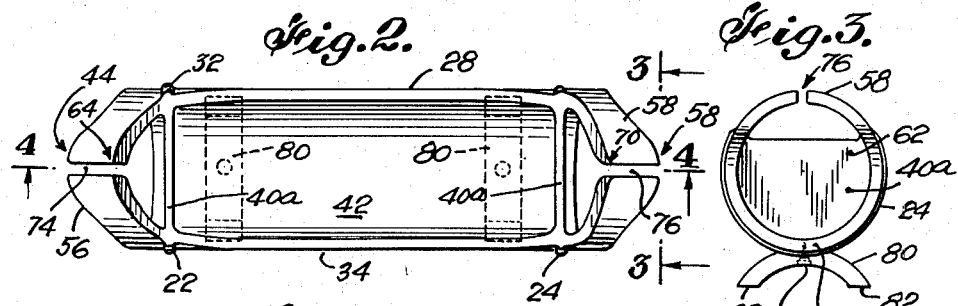
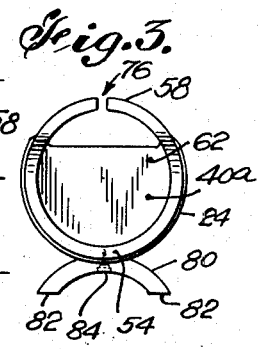
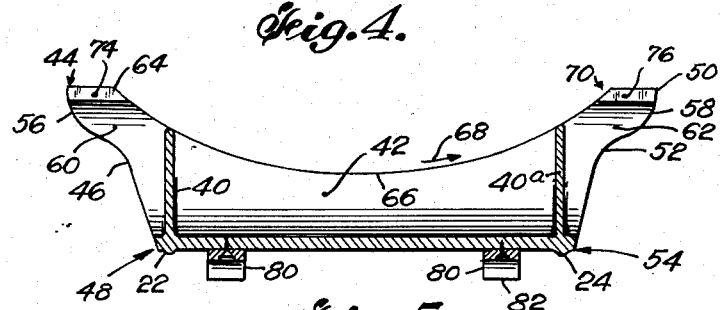
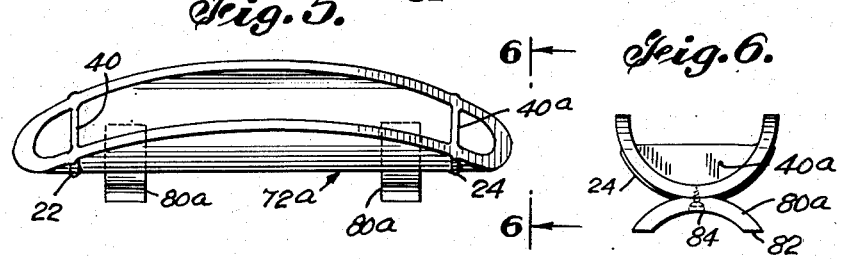
INVENTOR
LLOYD DOBKIN
ATTORNEY

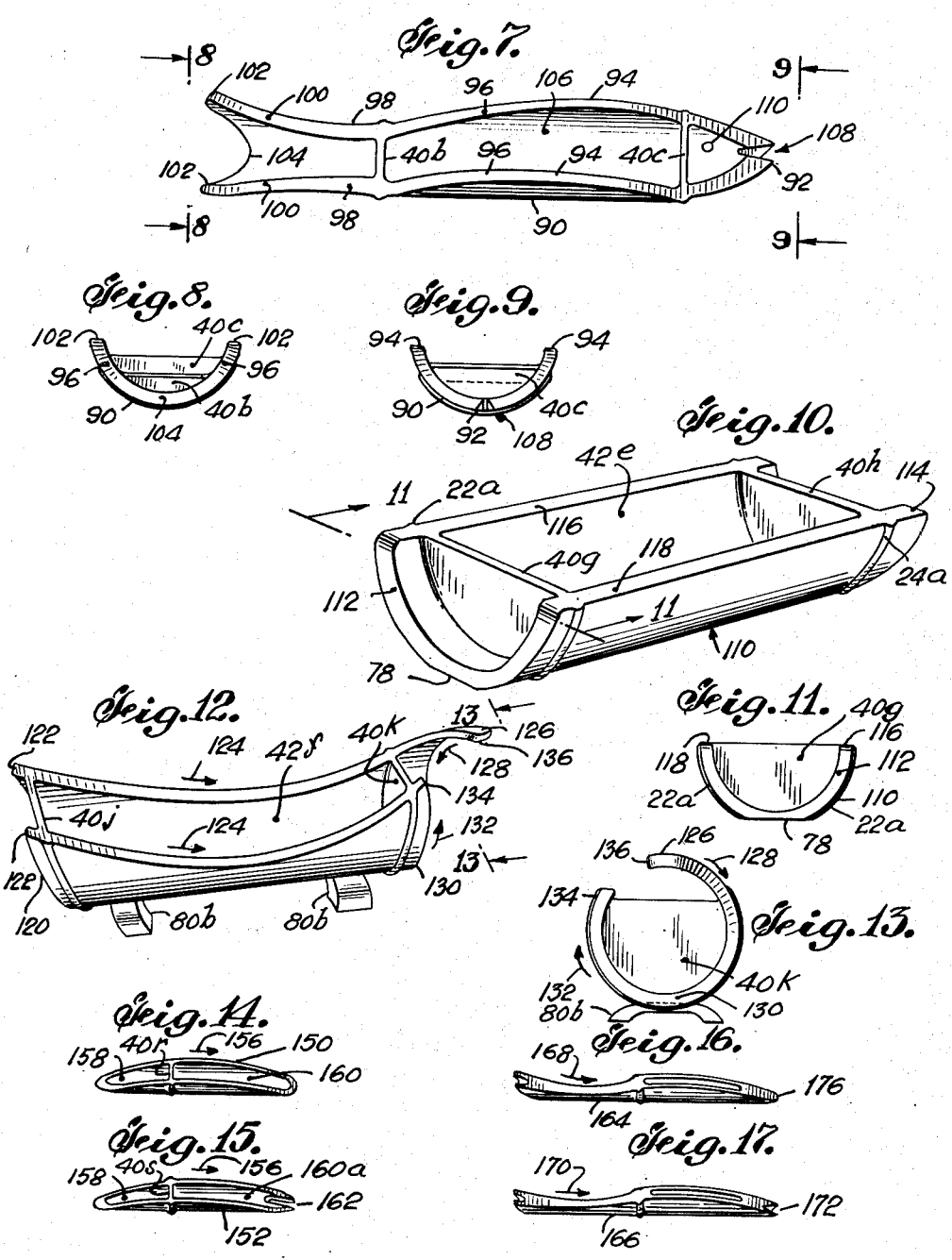

United States Patent Office 2,695,722
Patented Nov. 30, 1954

2,695,722

BAMBOO ARTICLE

Lloyd Dobkin, New York, N. Y.

Application April 11, 1951, Serial No. 220,480

5 Claims. (Cl. 217—5)

This invention relates to articles made from bamboo and the like, and methods of making the same.

An object of the invention is to provide a novel and improved method of making articles from materials in the nature of bamboo and the like.

Another object of the invention is to provide novel and improved articles in which bamboo and similar materials form the major construction materials.

A further object of the invention is to provide novel and improved articles and method for making the same from fibrous materials in the nature of bamboo and the like, by taking major and minor cuts through bamboo stem sections which are originally generally cylindrical and constructing articles therefrom.

Another object of the invention is to provide a novel and improved construction of articles made from generally cylindrical materials which may have interior transverse compartmental walls at intervals therealong.

Still another object of the invention is to provide novel and improved construction of articles made from materials in the nature of bamboo stems and the like, by means of which a curved plane sectional cut is taken in a generally longitudinal direction, the cut commencing at a predetermined location along a longitudinal line parallel to the axis of the bamboo stem, thence proceeding along the curved plane into the body of the stem to a predetermined depth of penetration and thence continuing smoothly in an outward direction to a second predetermined location along said longitudinal line but substantially spaced therefrom, so that in the process a portion of a cylinder is severed from the main stem body.

Still a further object of the invention is to provide novel and improved construction of articles as described herein, with novel means for controlling unwanted splitting of the bamboo articles by means of controlled incisions and slots formed as and in accordance with a predetermined pattern.

Another object of the invention is to provide novel and improved utility articles for use as containers, utensils, implements for household and other uses, made of inexpensive materials and by inexpensive manufacturing processes, yet which are sturdy and attractive in appearance.

These and other objects and advantages of the invention will become apparent from the following description of a preferred embodiment thereof as illustrated in the accompanying drawings, forming a part hereof, and in which:

Figure 1 is a perspective view showing a section of bamboo stem or trunk, and the cuts made therein to form an article according to the invention, the various portions being shown in exploded arrangement.

Figure 2 is a top plan view of the centermost article shown in Figure 1, apart from the other exploded elements.

Figure 3 is a right end elevational view as seen substantially on plane 3—3 of Figure 2.

Figure 4 is a longitudinal sectional elevational view taken on plane 4—4 of Figure 2.

Figure 5 is a frontal perspective view of the topmost exploded element shown in Figure 1, as seen when inverted and provided with feet or legs.

Figure 6 is a right end elevational view of the device shown in Figure 5, as seen on plane 6—6 of Figure 5.

Figure 7 is a frontal perspective view as seen from a slight elevation similar to Figure 5, of another modified form of the invention showing a device cut from a section of bamboo stem or log.

Figure 8 is a left end elevational view of the device shown in Figure 7, as seen on plane 8—8 of Figure 7.

Figure 9 is a right end elevational view of the device shown in Figure 7, as seen on plane 9—9 of Figure 7.

Figure 10 is a three quarter perspective view of another modified form of the invention as seen from a slight elevation.

Figure 11 is a left end elevational view taken on plane 11—11 of Figure 10.

Figure 12 is a frontal perspective view as seen from a slight elevation, showing another modified form of the invention, cut from a section of bamboo stem or log.

Figure 13 is a right end elevational view of the device shown in Figure 12, as seen on plane 13—13 of Figure 12.

Figure 14 is a frontal perspective view showing an implement made according to the invention, the device being slightly tilted toward the observer for clarity of illustration.

Figure 15 is a frontal perspective view showing another form of implement made according to the invention, with bifurcated end, as viewed from the same plane as that of Figure 14.

Figure 16 is a frontal perspective view showing still another form of implement made according to the invention, the view being taken frontally from a slight elevation just like Figure 14, for clarity of illustration.

Figure 17 is a view similar to that of Figure 16, but showing another form of implement with bifurcated end.

In the making of articles from products found in the raw state in nature, it is important that they be made quite sturdy, and so as not to be subject to ready deterioration or breakage in use. Where plant materials are employed, it is frequently found that natural drying thereof while severed from their roots, not only impairs their utility, but frequently makes it impossible to use them at all. The present invention discloses the construction of articles from bamboo trunks and stems and the like, with particular attention paid to making them not only sturdy and attractive, but also quite utilitaritan, and by construction according to the invention, not subject to splitting or other deterioration at undesired locations.

In order to understand clearly the nature of the invention, and the best means for carrying it out, reference may now be had to the drawings, in which like numerals denote similar parts throughout the several views.

As shown in Figure 1, there is a section of a bamboo stem or log generally indicated as at 20, such bamboo stems being generally cylindrical. As is well known, a bamboo stem or log is divided at nodes such as 22 and 24 into cylindrical segments such as segments 26, 28 and 30. At each of the nodes such as node 22, there may be an annular node irregularity or band 32, which is visible around the exterior surface 34 of the stem, and directly inside each such node ring or band 32, is an interior compartment wall or disc 40, 40a, 40b, 40c, etc., as the case may be, the suffixes being added to the numerals only to direct the attention of the reader hereof to any particular nodal interior wall or compartmental divider.

It is thus seen that any two successive or adjacent mutually spaced nodal partitions such as 40 and 40a thus divide the long log or stem 20 into a cylindrical chamber 42 closed at each end by the partitions 40 and 40a which latter are integral with the cylindrical wall 28 and extend transversely thereacross. Now, then, in order to form a utility article from the bamboo stem or log shown in Figure 1, I take a saw or other cutting implement and commence a transverse cut at location 44 into the bamboo log 20 in a downward direction, and thence smoothly along a curve as shown at 46 inclined toward the right, and thence continuing onward downwardly along a curve substantially as shown, to location 48 at the bottom, thus completing the cut and severing the left hand segment portion 26 from the intermediate segment portion 28 in a location which is entirely to the left of the nodal girdle 32.

A similar transverse cut is made at the right of Figure 1, commencing at location 50, using a scroll or band saw preferably, and cutting downwards along the curved plane as at 52, and thence smoothly downwards along the curve as shown substantially, right down to location 54 at the bottom, thus severing the right stem segment 30 from the intermediate stem segment 28 along this curved planar cut. Figure 1 of course, shows the cut sections exploded or spaced for clarity only.

It is noted that the remaining intermediate segment 28 now has a cylindrical body, with upwardly enlarging shoulders 56 and 58 outwardly of the respective nodal walls or dividers 40 and 40a, the shoulders being thus hollow as shown best in Figures 3 and 4, and defining recesses or hollow areas 60 and 62. I may now take the intermediate segment 28 and commence a saw cut at location 64, cutting into the body of the segment in a rightwardly smoothly downward direction along the curve to location 66, and thence rightwardly smoothly upwardly again in the direction indicated generally by arrow 68, right up to location substantially shown at about 70, so that the portion shown at 72 is completely severed or cut off from the remaining lower portion 28, so that it may be lifted up as shown in Figure 1, and used as a removable cover member for the chamber 42 which may be employed to contain any suitable materials, foods, or fluids.

It is noted that the saw cut which severed the top portion 72 from the lower body 28 was taken so as to cut across and into the upper portions of the dividing nodal walls 40 and 40a, so that the severed portions of the nodal walls are now integral with the top member 72, seen in inverted position in Figures 5 and 6. I now take a longitudinal saw or other cut right through the tops of each of the shoulders 56 and 58, as shown, thus forming longitudinal slots 74 and 76, which aid considerably in preventing undesired splitting at undesirable locations as the bamboo dries out or ages.

To support the container 28 shown in the central portion of Figure 1, and in Figures 2, 3 and 4, I may either flatten out the undersurface by taking a plane cut as shown best in Figure 11 at 78, to prevent tipping or rolling over. Or I may cut out from another portion of the bamboo log, say from one of the segments 26 or 30, curved or arcuate legs 80, the feet 82 of which may be in one plane so as to rest on a table top or other surface, while the central portion 84 is secured to the underside of the main body 28 by any suitable fastennig means, as by screws as seen in Figure 4.

If desired, the top piece 72 may be provided with a handle or knob secured to its upper surface to facilitate lifting it to uncover the chamber 42, or it may be used separately as a separate container as seen in Figures 5 and 6, with its own legs 80a affixed thereto in the manner shown.

Referring now to Figures 7, 8 and 9, it is seen that a bamboo log or stem 90, which was originally cylindrical like the original stem of Figure 1, has been subjected to a number of saw cuts to produce a highly useful article. Thus I take a saw cut commencing at location 92 along the bottom longitudinal surface of the log, and continue the cut upwards leftwardly along the curve shown substantially, as along at 94 and thence downwardly smoothly again as at 96 to the valley 98 just past the partition 40b, and thence upwardly again as at 100 to the horn ends or fin ends 102, and thence downwardly sharply and slightly rearwardly to location 104 at which point the device shown in Figure 7 has been entirely severed from the rest of the originally substantially cylindrical bamboo log. The narrowed portion 98 thus forms an excellent handle for grasping the device, and the intermediate chamber or recess 106 thus defined between walls 40b and 40c is an excellent receptacle, while the rightward or forward end may be bifurcated as at 108 for any desired purpose including digging into some material. An opening or eyelet 110 permits the device to be hung on a nail. The forward slot or groove 108 also contributes to controlling splitting so that it will not take place in any undesired location as the bamboo dries out or ages.

Figure 10 shows another form of the invention in which a section 110 of a bamboo log has been cut transversely along planes defining its end edges 112 and 114, somewhat outside of and beyond respectively, the interior nodal compartment walls, so as to form a cylindrical portion of the log. Then I may take a longitudinal cut on the plane containing the upper edges 116 and 118, right through the nodal walls 40g and 40h, thus forming the substantially hemi-cylindrical container and receptacle device shown in Figures 10 and 11, with its upwardly open chamber 42e. To avoid wobbling or tipping over, I may take a plane cut as at 78 on the bottom, forming a plane surface thereat to rest upon any table top or other convenient surface.

Figures 12 and 13 show another modified form of the invention, in which a first transverse cut is taken in a bamboo log in plane 120 to the left of compartmenting wall 40j, and then a curved cut is taken commencing with locations 122 and thence proceeding rightwardly and smoothly downwardly in the directions of arrows 124, and thence upwardly in a rightward direction right across the upper portion of dividing wall 40k, cutting off an upper portion thereof like was done with wall 40j, and thence upwards smoothly to location 126 which thus severs the member shown in Figure 12 from both the leftward log segment not shown in Figure 12, and the upper portion, which corresponds somewhat to the portion 72 shown in Figure 1. I then take a cut commencing at location 126, down around the wall in the direction of arrow 128, and down to the bottom at 130, and thence upwards in the direction of arrow 132 to location 134, intersecting with the curved plane of the cuts taken along arrows 124. I then complete the cut by cutting around the small curve at 136, thus severing the device shown in Figure 12 from the rest of the bamboo log which was to its right, and corresponded to segment 30 of Figure 1. The portion at 126 and adjacent thereto provides a convenient handle for gripping and lifting or carrying the device shown in Figures 12 and 13, and various materials and fluids may be placed in the receptacle 42f chamber formed therein between walls 40j and 40k. Curved legs 80b may be secured thereto as shown, if desired.

Figures 14 and 15 show how useful implements 150 and 152 may be formed by relatively simple curved cuts along curved planes indicated by arrows 156, through nodal dividing walls 40r or 40s, may be constructed. The device shown in Figure 14 has smoothly rounded left and right ends, and may be used as a spoon or scoop, having two recesses or receptacles 158 and 160 formed therein, one to be gripped by the fingers, and the other to dig in. In Figure 15, the construction is the same in general, except that one end is bifurcated as at 162, to serve as a fork also.

Figures 16 and 17 show other modified forms of the invention, in which implements 164 and 166 are formed from a cylindrical log of bamboo by taking curved cuts along the planes indicated by arrows 168 and 170, somewhat in the manner of Figure 7, the form of Figure 17 being bifurcated at the right at 172 to provide sharp ends for use as a fork or similar implement, while the device of Figure 16 is rounded at the right end 176, and serves as a spoon or scoop, being grasped at the left end.

Although I have described my invention in specific terms, it will be understood that various changes may be made in size, shape, material and arrangement without departing from the spirit and scope of the invention as claimed.

I claim:

1. A utility article formed of bamboo and comprising a substantially semi-cylindrical hollow stem section, interior first and second nodal transverse walls at each end of said stem section, and defining therebetween a hollow interior compartment, first and second stem section shoulders formed at each end of said stem section, exteriorly of and extending outwardly from said first and second nodal transverse walls, with longitudinal grooves formed through said stem section shoulders, the upper side opened hollow stem section being longitudinally cut away to form an upwardly facing opening.

2. The construction according to claim 1, wherein said first and second nodal transverse walls are substantially incomplete circular discs lacking an upper chordal segment.

3. The construction according to claim 1, wherein an upper edge of said opening extends along a curved plane intersecting with upper portions of both said first and second nodal transverse walls so as to truncate the same, and intersects with upper portions of said stem section shoulders exteriorly of said first and second nodal transverse walls.

4. The construction according to claim 1, wherein a lower portion of said stem section is plane, and engageable in contact engagement with a plane surface for being supported thereon without tipping.

5. The construction according to claim 1, wherein legs are provided and secured to lower portions of said stem section, said legs being curved to form feet at each end, and being secured intermediate said feet to the undersurface of said stem section to support the same in a stable manner.

References Cited in the file of this patent

UNITED STATES PATENTS

| Number | Name | Date |
| --- | --- | --- |
| D. 71,098 | Banner et al. | Sept. 21, 1926 |
| D. 71,999 | Brown | Feb. 15, 1927 |
| 246,040 | Sheldon | Aug. 23, 1881 |
| 964,844 | Boughton | July 19, 1910 |
| 1,128,114 | Doellinger | Feb. 9, 1915 |
| 1,188,573 | Takeuchi | June 27, 1916 |
| 1,239,346 | Brown | Sept. 4, 1917 |
| 1,347,307 | Thomas | July 20, 1920 |
| 1,645,812 | Lane | Oct. 18, 1927 |
| 1,713,683 | Wensel | May 21, 1929 |